US007962843B2

(12) United States Patent
Milic-Frayling et al.

(10) Patent No.: US 7,962,843 B2
(45) Date of Patent: Jun. 14, 2011

(54) BROWSER SESSION OVERVIEW

(75) Inventors: Natasa Milic-Frayling, Cambridge (GB); Samuel Gavin Smyth, Huntingdon (GB); Kerry Rodden, Palo Alto, CA (US); Rachel Jones, Cambridge (GB); Alan Frank Blackwell, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1296 days.

(21) Appl. No.: 10/839,910

(22) Filed: May 5, 2004

(65) Prior Publication Data
US 2005/0132018 A1 Jun. 16, 2005

Related U.S. Application Data

(60) Provisional application No. 60/529,823, filed on Dec. 15, 2003.

(51) Int. Cl.
*G06F 17/00* (2006.01)
(52) U.S. Cl. .......... 715/206; 715/205; 715/255; 715/738
(58) Field of Classification Search .......... 715/205–206, 715/738, 854, 255–256
See application file for complete search history.

(56) References Cited

U.S. PATENT DOCUMENTS

| | | | |
|---|---|---|---|
| 5,603,034 A | 2/1997 | Swanson | |
| 5,727,129 A | 3/1998 | Barrett et al. | |
| 5,864,863 A | 1/1999 | Burrows | |
| 6,012,093 A * | 1/2000 | Maddalozzo et al. | 709/223 |
| 6,035,332 A * | 3/2000 | Ingrassia et al. | 709/224 |
| 6,037,934 A | 3/2000 | Himmel et al. | |
| 6,243,091 B1 | 6/2001 | Bertis | |
| 6,256,028 B1 | 7/2001 | Sanford et al. | |
| 6,301,584 B1 | 10/2001 | Ranger | |
| 6,310,630 B1 * | 10/2001 | Kulkarni et al. | 715/776 |
| 6,353,839 B1 * | 3/2002 | King et al. | 715/236 |
| 6,483,525 B1 | 11/2002 | Tange | |
| 6,526,440 B1 | 2/2003 | Bharat | |
| 6,667,751 B1 * | 12/2003 | Wynn et al. | 715/833 |
| 6,670,974 B1 | 12/2003 | McKnight et al. | |
| 6,686,918 B1 | 2/2004 | Cajolet et al. | |
| 6,754,873 B1 | 6/2004 | Law et al. | |
| 6,934,912 B2 | 8/2005 | Simpson et al. | |
| 6,952,799 B2 * | 10/2005 | Edwards et al. | 715/207 |
| 7,075,550 B2 | 7/2006 | Bonadio | |
| 7,162,471 B1 | 1/2007 | Knight et al. | |
| 7,165,070 B2 | 1/2007 | Page et al. | |

(Continued)

OTHER PUBLICATIONS

"Girafa" Internet Web Site Published at www.girafa.com, at least as early as Jan. 2004.

(Continued)

*Primary Examiner* — Thu Huynh

(57) ABSTRACT

A method includes storing one or more resource identifiers identifying one or more associated resources visited using a browser application, and presenting the resource identifiers in an order designated by one of a plurality of history presentation settings and resource navigation context specifications. The history presentation setting and navigation context can be selected by a user. Exemplary history presentation settings include chronological and domain-name grouped. Exemplary navigation context includes resource identifier, such as name, URI, or domain of the currently viewed resource. The method may further include presenting a thumbnail when a pointer icon is positioned over one of the resource identifiers. A system includes a navigation event capture module storing resource identifiers identifying associated visited resources in a navigation history and an overview module ordering the resource identifiers in an order designated by one of a plurality of history presentation settings and resource navigation context specifications.

20 Claims, 9 Drawing Sheets

U.S. PATENT DOCUMENTS

| | | | |
|---|---|---|---|
| 7,225,407 B2* | 5/2007 | Sommerer et al. | 715/738 |
| 7,373,614 B1* | 5/2008 | Holmes | 715/855 |
| 7,421,657 B1* | 9/2008 | Dawson-Granados et al. | 715/739 |
| 7,614,004 B2 | 11/2009 | Milic-Frayling et al. | |
| 7,617,458 B1* | 11/2009 | Wassom et al. | 715/760 |
| 7,647,338 B2 | 1/2010 | Lazier et al. | |
| 7,774,721 B2 | 8/2010 | Milic-Frayling et al. | |
| 2001/0034742 A1 | 10/2001 | Stinson | |
| 2002/0010715 A1* | 1/2002 | Chinn et al. | 707/514 |
| 2002/0060701 A1 | 5/2002 | Naughton et al. | |
| 2002/0078043 A1 | 6/2002 | Pass et al. | |
| 2002/0091732 A1* | 7/2002 | Pedro | 707/505 |
| 2002/0103824 A1* | 8/2002 | Koppolu et al. | 707/501.1 |
| 2002/0120619 A1 | 8/2002 | Marso et al. | |
| 2002/0143864 A1 | 10/2002 | Page et al. | |
| 2002/0147796 A1* | 10/2002 | Chung | 709/220 |
| 2002/0191015 A1* | 12/2002 | Brown et al. | 345/738 |
| 2003/0046366 A1 | 3/2003 | Pardikar et al. | |
| 2003/0122865 A1* | 7/2003 | Lake et al. | 345/738 |
| 2003/0132957 A1 | 7/2003 | Ullmann et al. | |
| 2003/0200505 A1 | 10/2003 | Evans | |
| 2004/0001092 A1 | 1/2004 | Rothwein et al. | |
| 2004/0003351 A1 | 1/2004 | Sommerer et al. | |
| 2004/0064438 A1 | 4/2004 | Kostoff | |
| 2004/0143564 A1 | 7/2004 | Gross et al. | |
| 2004/0148591 A1 | 7/2004 | Kumhyr et al. | |
| 2004/0193699 A1 | 9/2004 | Heymann et al. | |
| 2005/0021494 A1 | 1/2005 | Wilkinson | |
| 2005/0033657 A1 | 2/2005 | Herrington et al. | |
| 2005/0086613 A1* | 4/2005 | McKnight et al. | 715/855 |
| 2005/0114798 A1 | 5/2005 | Jiang et al. | |
| 2005/0132018 A1 | 6/2005 | Milic-Frayling et al. | |
| 2005/0132296 A1 | 6/2005 | Milic Frayling et al. | |
| 2005/0132297 A1 | 6/2005 | Milic Frayling et al. | |
| 2005/0273718 A1* | 12/2005 | Naas | 715/745 |
| 2006/0031214 A1 | 2/2006 | Solaro et al. | |
| 2006/0074873 A1 | 4/2006 | Dettinger et al. | |
| 2006/0271526 A1 | 11/2006 | Charnock et al. | |
| 2007/0067297 A1 | 3/2007 | Kublickis | |
| 2007/0118533 A1 | 5/2007 | Ramer et al. | |
| 2007/0250492 A1 | 10/2007 | Angel et al. | |
| 2008/0033919 A1 | 2/2008 | Arrouye et al. | |
| 2008/0059453 A1 | 3/2008 | Laderman | |
| 2009/0094216 A1 | 4/2009 | Hou et al. | |
| 2009/0177381 A1 | 7/2009 | Taniguchi et al. | |

OTHER PUBLICATIONS

"Opera" Internet Web Site, Features and Functions Published at http://www.opera.com/features/, at least as early as Mar. 2004.

"Apple—Safari" Internet Web Site, Published at http://www.apple.com/safari/, at least as early as Mar. 2004.

Ayers, E. Z., Stasko, J. T.; "Using Graphic History in Browsing the World Wide Web", Technical Report GIT-GVU-95-12, May 1995, 14 pages.

Catledge, L. D., Pitkow, J. E.; "Characterizing Browsing Strategies in the World-Wide Web", Computer Networks and ISDN Systems v26 n6, Dec. 1998 pp. 1065-1073.

Cockburn, A., McKenzie, B., Jasonsmith, M.; "Pushing Back: Evaluating a New Behaviour for the Back and Forward Buttons in Web Browsers", International Journal of Human-Computer Studies.

Cockburn, A., Greengberg, S., McKenzie, B., Jasonsmith, M, Kaasten, S.; "WebView: A Graphical Aid for Revisiting Web Pages" in 'Proceedings of the OZCHI'99 Australian Conference on Human Computer Interaction', Nov. 1999, 6 pages.

Cockburn, A., Jones, S.; "Which Way Now? Analysing and Easing Inadequacies in WWW Navigation" International Journal of Human-Computer Studies v45 i1, Jul. 1996, pp. 105-129.

Cockburn, A., McKenzie, B.; "What do Web Users Do? An Empirical Analysis of Web Use" International Journal of Human-Computer Studies v54 i6, Jun. 2001, pp. 903-922.

Greenberg, S., Cockburn, A.; "Getting Back to Back: Alternate Behaviors for a Web Browser's Back Button" in Proceedings of the 5th Annual Human Factors and the Web Conference held at NIST, Gaithersburg, Maryland, Jun. 1999, 8 pgs.

Kaasten, S., Greenberg, S.; "Integrating Back, History and Bookmarks in Web Browsers" in Extended Abstracts of the ACM Conference of Human Factors in Computing Systems, ACM Press, 2001, pp. 379-380.

McKenzie, B., Cockburn, A.; "An Empirical Analysis of Web Page Revisitation" HICSS archive Proceedings of the 34th Annual Hawaii International Conference on System Sciences v5, 2001, 9 pgs.

Milic-Frayling, N., Sommerer, R., Tucker, R.; "MS WebScout: Web Navigation Aid and Personal Web History Explorer", in Proceedings of WWW2002 Honolulu, Hawaii, May 2002, 6 pages.

Milic-Frayling, N., Sommerer, R., Rodden, K.; "WebScout: Support for Revisitation of Web Pages Within a Navigation Session", IEEE/WIC International Conference on Web Intelligence Halifax, Canada, Oct. 2003, 5 pages.

Tauscher, L., Greenberg, S.; "How People Revisit Web Pages: Empirical Findings and Implications for the design of History Systems", International Journal of Human-Computer Studies, v47, 1997, pp. 97-137.

Foulonneau, Muriel et al.; "Using collection descriptions to enhance an aggregation of harvested item-level metadata"; ACM; 2005; pp. 32-41.

Kherfi, M.L. et al.; "Image retrieval from the world wide web issues, techniques, and systems"; ACM Computing Surveys; vol. 36, No. 1; Mar. 2004; pp. 35-67.

Funkhouser, Thomas et al.; "Shape-based retrieval and analysis of 3D models"; ACM; Aug. 2004; PDF pp. 1-62.

Tangelder, J. et al.; "A Survey of Content Based 3D Shape Retrieval Methods"; ACM; Aug. 2004; pp. 1-12.

Shilane, P. et al.; "The Princeton Shape Benchmark"; ACM; Aug. 2004; pp. 1-12.

Funkhouser, Thomas, et al.; "A Search Engine for 3D Models"; ACM; Aug. 2004; pp. 1-28.

Min, P. et al.; "Early Experiences with a 3D Model Search Engine"; ACM; Aug. 2004; pp. 1-12.

Hilaga, M. et al.; "Topology Matching for Fully Automatic Similarity Estimation of 3D Shapes"; ACM; Aug. 2004; pp. 203-212.

PG Pub. 2010/0306665 (U.S. Appl. No. 12/839,390 filed Jul. 19, 2010 including all office communications); published Dec. 2, 2010. (No Office Action for U.S. Appl. No. 12/839,390).

* cited by examiner

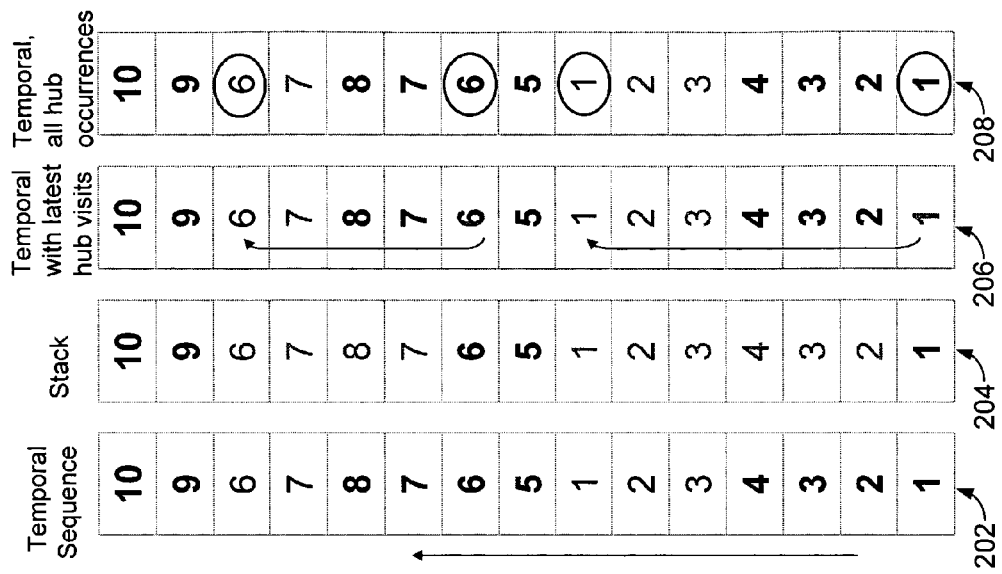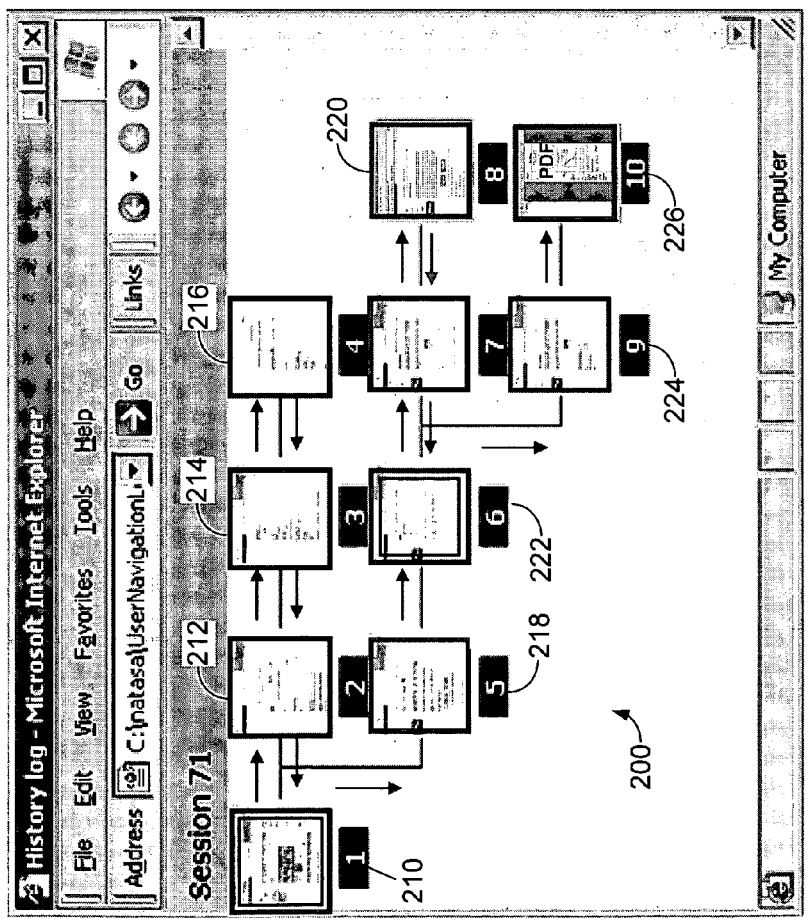
Fig. 2

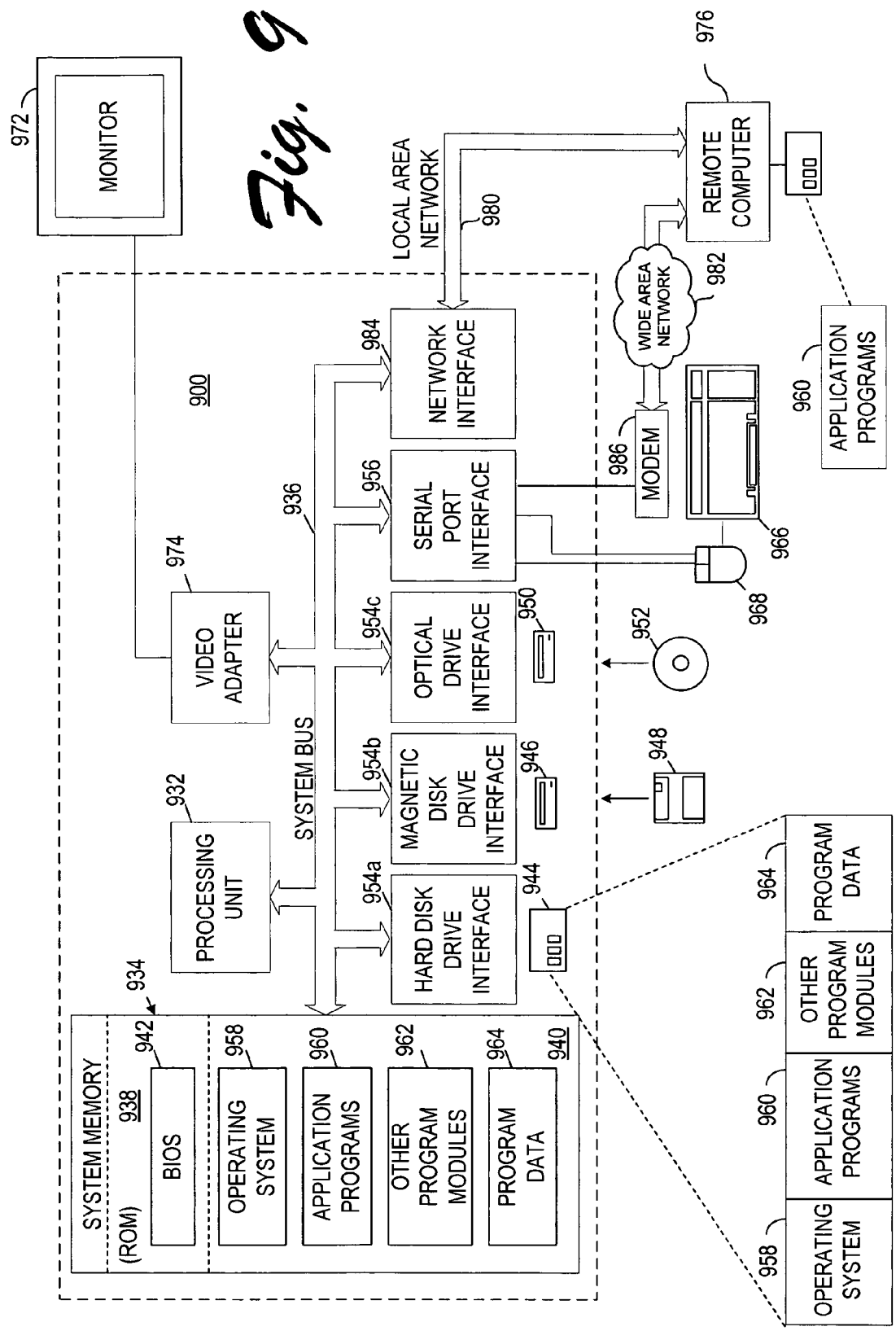

BROWSER SESSION OVERVIEW

RELATED APPLICATIONS

This patent application claims priority from U.S. Provisional Patent Application Ser. No. 60/529,823, filed on Dec. 15, 2003, and entitled "Smart Navigation Systems and Methods," which is incorporated herein by reference for all that it discloses. This patent application is also related to co-owned U.S. patent application Ser. No. 10/839,903, entitled "Intelligent Forward Resource Navigation," and U.S. patent application Ser. No. 10/839,924, entitled "Intelligent Backward Resource Navigation," the disclosures of which are incorporated herein by reference for all that they disclose.

TECHNICAL FIELD

The described subject matter relates to resource browsing, and more particularly to browser session overview.

BACKGROUND

A browser is a computer application program that enables a computer user to view (i.e., browse) web pages and other resources. The user specifies a resource identifier, such as a universal resource identifier (URI), which directs the browser to the specified resource. Typically, as the user browses resources, the browser maintains a history of visits to resources that have been accessed, and provides tools whereby the user can access a previously visited resource from the history. Unfortunately, the history that is stored and presented by a traditional browser is often cluttered, incomplete, imprecise as multiple resources may be given the same label, and furnished with a user interface that is insufficiently connected with resource browsing or search interface. Thus, such history based tools are time consuming or confusing to use.

For example, INTERNET EXPLORER by MICROSOFT provides a "Favorites" menu item, with which a user can designate a currently visited resource as a favorite and later return to that resource in the same session or another session. Although "Favorites" provides some level of historical recall, the favorites list is often cluttered. What actually tends to happen is a user fills the favorites list with so many resources that the list becomes difficult for the user to later find the favorite resource. In some instances, it may take the user longer to locate the favorite resource in the "Favorites" than it would be to find the resource by some other means (e.g., a search engine).

Other tools often provided by browsers are "History" or "Address Dropdown" tools. These tools simply present all the previously visited resource identifiers. Even after a relatively short browsing session, the traditional "History" and "Address Dropdown" lists can be filled with such a large number of resource identifiers, such as resource URI, resource name, or similar labels, that the lists are cluttered and difficult for quickly retrieving a desired resource. Some resource identifiers are insufficiently informative to enable the user to confidently choose the desired resource from the list. Indeed, the history typically retains the name of the resource which is not necessarily unique but can be shared by a number of resources. Resource URI may be too long and not easily interpreted or remembered by the user.

Furthermore, users are often confused by such long lists of identifiers because they are not context sensitive, i.e., they do not link the current user's experience or intention with the resources on the list. For example, if the user has recently visited resources A, B, and C, and the user decides to use History to revisit a previously seen resource M from the list, the display of the History typically does not provide an indication of the currently viewed resource, such as a 'you are here' pointer, (e.g., by highlighting the indicator of the currently viewed resource C or recently visited resources A, B, and C). The user cannot easily orientate himself or herself within the resource list and browse or search for the resource identifier. Thus, users frequently waste time searching through such lists. In addition, the resource identifiers are typically not presented in any particular order or with any preference information that may assist the user in quickly identifying a desired resource that was previously visited. Indeed, the lists are typically not structured based on user's tasks, activities or other attributes that would break the long list into logical, usable, and understandable sequences of resources.

As such, traditional browsing histories have drawbacks that make it difficult for a user to quickly and efficiently locate preferred resources that were previously visited.

SUMMARY

Implementations are described and claimed herein for storing and presenting a navigation history allowing for quick identification and access to a desired resource. Implementations utilize a "browser session overview" scheme that presents resource identifiers, such as resource name, URI, or other resource label, in a browser session overview according to a user-selectable setting and resource browsing context information, such as indication of the currently viewed resource or the domain of the currently viewed resource, or multiple recently viewed resources. Target resources can be marked with a target icon in the browser session overview. In addition, when the pointer icon is positioned over a resource identifier or icon in the browser session overview, a thumbnail of the associated resource can be presented.

An implementation of a system includes a navigation event capture module storing resource identifiers identifying associated visited resources in a navigation history and an overview module ordering the resource identifiers in an order designated by one of a plurality of history presentation settings. The system may further include a configuration window having a history presentation setting field in which a user can select one of the plurality of history presentation settings. The system monitors and records a context of resource navigation. Context information determines which part of the resource navigation history is to be presented. The system may include context information in the resource presentation.

An implementation of a method includes storing one or more resource identifiers identifying one or more associated resources visited using a browser application, and presenting the resource identifiers in an order designated by one of a plurality of history presentation settings and resource navigation context information. The method may further include selecting one of the plurality of history presentation settings and resource navigation context types. Exemplary history presentation settings include chronological and domain-name grouped. Exemplary resource navigation context includes information about the currently viewed resource, i.e., the resource URI and name and the resource domain name. The method may further include presenting a thumbnail when a pointer icon is positioned over one of the resource identifiers.

In some implementations, articles of manufacture are provided as computer program products. One implementation of a computer program product provides a computer program storage medium readable by a computer system and encoding a computer program for presenting a browser session overview of one or more resource identifiers in an order designated by a history presentation order setting. Another implementation of a computer program product may be provided in a computer data signal embodied in a carrier wave by a computing system and encoding the computer program for presenting the browser session overview.

A computer-readable medium encodes a computer program causing a computer to execute a process including presenting a browser session overview of one or more resource identifiers in an order designated by a history presentation order setting. The process may further include detecting hovering of a pointer icon over one of the resource identifiers and responsively presenting a thumbnail of a resource identified by the resource identifier.

BRIEF DESCRIPTION OF THE DRAWINGS

FIG. 2 illustrates an exemplary resource navigation map and corresponding exemplary navigation histories;

FIG. 9 illustrates a generalized computing device that may be used to implement a browser session overview.

DETAILED DESCRIPTION

Overview

Briefly, a browser session overview presents a navigation history of resource identifiers in a context sensitive manner. Context sensitive presentation involves presenting the resource identifiers in an order according to a history presentation setting and a resource browsing context. Exemplary history presentation settings are chronological and domain-name grouping. Exemplary resource navigation context includes information about the currently viewed resource, i.e., the resource URI and name and the resource domain name. Session overview may present part of the resource navigation history in the proximity of the currently viewed resource in the order specified by the history presentation settings. The browser session overview serves as a single point of access, by identifying resources browsed in other browser sessions and other browser windows. Thumbnail images of a resource can be presented when a pointer icon is hovered over the associated resource identifier in the browser session overview.

Exemplary System

Figure 1:
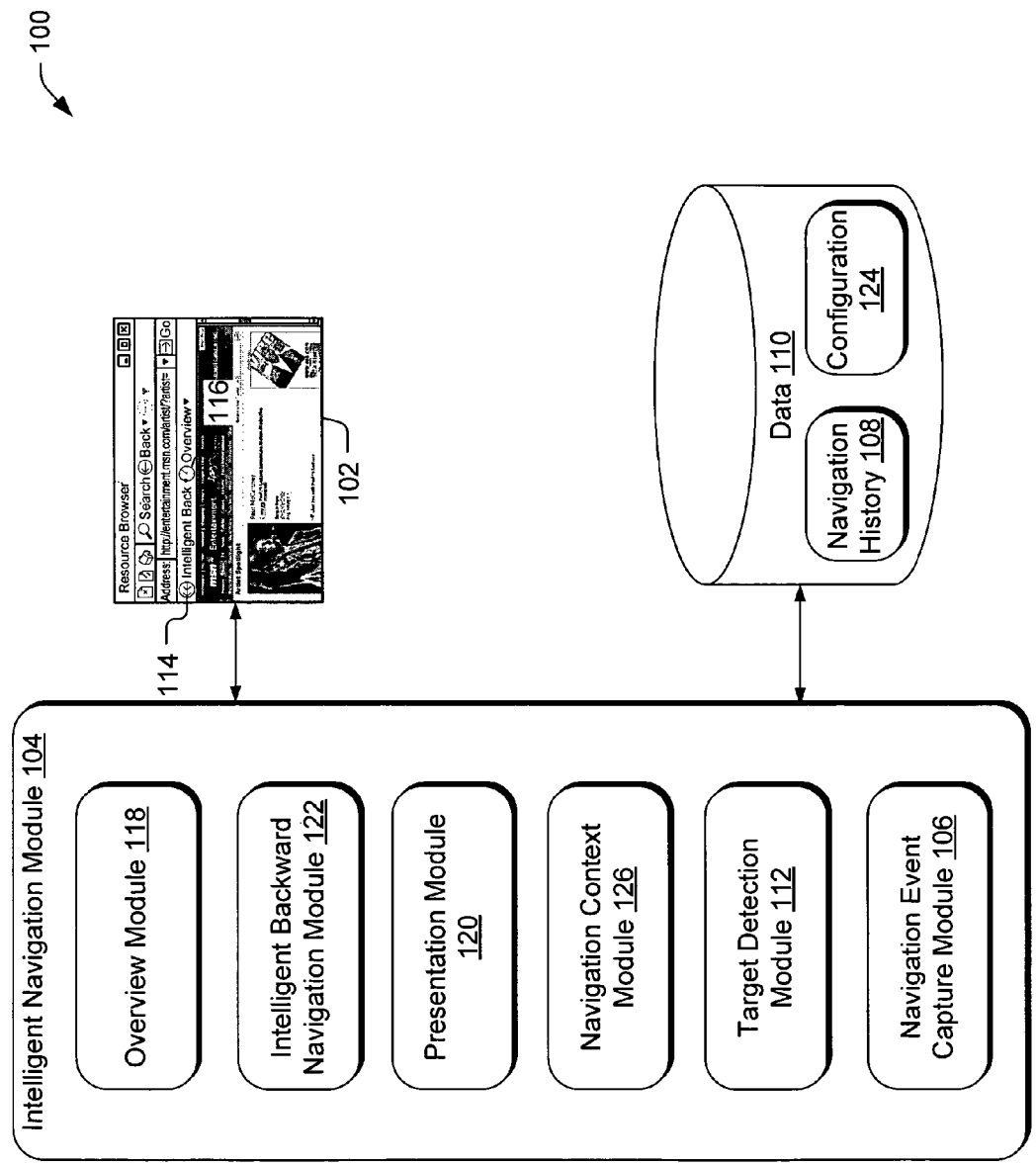
FIG. 1 illustrates an exemplary operating environment in which a browser session overview can be implemented.

FIG. 1 illustrates an exemplary operating environment 100 in which browser session overview can be carried out. In general, a resource browser window 102 is presented, through which a user can visit or access resources. As used herein, the terms "visiting a resource" and "accessing a resource" both refer to navigating to a resource through a resource browser window. As used herein, a resource refers to any uniquely addressable resource accessible by a browser application program (or simply "browser"), such as, but not limited to, a document (e.g., Portable Data Format (pdf) document, WORD document), or a Web page. As such, a resource can include various forms of media, such as, but not limited to, video, audio, text, and images. A resource can be remote or local to the computer that is browsing the resource.

Browser session may refer to the instance of the browser application, possibly with multiple browser windows, with end of session being associated with closing of all associated browser window instances. Alternatively, browser session may be defined as a sequence of user browsing activities with the session start and the session end defined in terms of navigation activities. For example, end of a session may be determined by the minimum duration of inactivity in resource navigation by the user.

An intelligent navigation module 104 facilitates browser session overview based on user input and a navigation history of resource identifiers (e.g., uniform resource identifiers (URIs)). The intelligent navigation module 104 can be implemented in different ways. For example, the intelligent navigation module 104 can be built into a browser application program (not shown). Alternatively, the intelligent navigation module 104 can be a separate stand-alone application (not shown) or a separately supplied executable to be loaded by the browser (i.e., a plug-in or applet) that extends the capabilities of the browser application program. As shown, the intelligent navigation module 104 includes a number of modules that manage resource navigation, navigation history presentation, target detection, and event capture.

While the user navigates, a navigation event capture module 106 detects and logs information about visited resources in a resource navigation history 108. The navigation history 108 is stored in data store 110. The navigation history 108 includes visited resource identifiers, order of resource visitation, resource branching information and other information. Resource branching information indicates how resources were accessed by branching from other resources.

A navigation context module 126 detects and stores context information related to a currently viewed resource. The context information can be used by the overview module 118 to provide context specific display of resource navigation history. In one implementation, resource navigation context information includes a name, URI, or domain, representing the currently viewed resource. The overview module 118 presents user navigation history (e.g., a list of resource identifiers) immediately preceding the currently viewed resource, indicating the current resource in the resource list. The overview module 118 can indicate the current resource in the resource list in any number of ways. By way of example, but not limitation, the current resource may by indicated by presenting the context information in bold, in a specified color (different from the other resource identifiers), or with a specified mark.

In another implementation, resource navigation context includes information about user activities in other applications. If the user is viewing a document in a document editor, the browser resource navigation history may display the history of resource navigation in the proximity of the time when the document has been last modified. This provides easy access to resources that may have been used to assist authoring of the document.

A target detection module 112 identifies and designates resource identifiers in the navigation history 108 as target resources based on user input and information in the navigation history 108. Further information regarding the target detection module 112 can be found in related U.S. patent application Ser. No. 10/839,924, entitled "Intelligent Backwards Resource Navigation".

After target resources have been designated in the resource navigation history 108 by the target detection module 112, the user can navigate to the targets using controls on the resource browser window 102, such as an intelligent backward navigation button 114 or an overview button 116. A presentation module 120 performs processing for rendering the intelligent backward navigation button 114 and the overview button 116, as well as processing for rendering other controls discussed below that relate to the overview and intelligent backward navigation. An intelligent backward navigation module 122 handles processing related to the intelligent backward navigation button 114. In general, the intelligent backward navigation module 122 implements the intelligent backward navigation button 114 behavior. Further information regarding the intelligent backward navigation button 114 and the intelligent backward navigation module 122 can be found in related U.S. patent application Ser. No. 10/839,924, entitled "Intelligent Backwards Resource Navigation".

An overview module 118 handles processing related to the overview button 116. In general, the overview module 118 implements the behavior of the overview button 116. Thus, the overview module 118 detects selection of the overview button 116 and responsively causes an overview of the resource identifiers of resources visited in a current or previous browser session to be presented. The overview module 118 orders and presents the resource identifiers according to a history presentation setting and context information specified by the resource navigation context module 126. Exemplary history presentation settings are a chronological, or temporal, setting and a domain-name grouped setting. The various history presentation settings and associated exemplary browser session overviews are discussed in further detail below with respect to FIG. 4, FIG. 5, and FIG. 7. Exemplary context specification is the URI, name, and domain of the currently viewed resource.

In addition to the navigation history 108, the data store 110 stores configuration data 124. Configuration data 124 includes settings that relate to intelligent backward navigation and browser session overview. Configuration data 124 can be entered by a user through a configuration window such as the configuration window shown in, and described with respect to, FIG. 7 below In one implementation of the data store 110, data is persistent across browser sessions. Whenever the user navigates to a resource the navigation history 108 is updated. The configuration data 124 is selected by the user and stored when the user presses OK. When another session of the browser application program is started, the previously stored navigation history 108 and configuration data 124 are used. As a result, resources visited during a current or previous browser session are identified in the navigation history 108. In another implementation of the data store 110 the navigation history 108 and the configuration data 124 are accessible to simultaneously executing sessions. For example, if multiple browser windows 102 are open, the navigation histories of both sessions can be stored in the navigation history 108 and accessed by either browser session. In this implementation, the navigation history 108 is dynamically updated as the user navigates to resources through each of multiple browser windows 102.

FIG. 2 illustrates an exemplary navigation map 200 and exemplary navigation histories 202, 204, 206, and 208 for keeping track of the resource navigation history. The navigation map 200 illustrates ten resources that have been visited. These resources are numbered sequentially from one to ten and presented as small resource page icons in a tree structure according to the order in which the resources were visited.

To illustrate, resource 1 (210) was visited first. From resource 1 (210), the user branched to resource 2 (212), for example, by clicking on a hyperlink embedded in resource 1 (210). From resource 2 (212), navigation proceeds to resource 3 (214) and resource 4 (216). Using a traditional back button, the user "backs up" the navigation path sequentially from resource 4 (216) to resource 1 (210). Once again at resource 1 (210), the user branches to resource 5 (218). Navigation proceeds sequentially from resource 5 (218) to resource 8 (220) via resource 6 (222). From resource 8 (220), navigation "backs up" sequentially to resource 6 (222). Navigation branches from resource 6 (222) to resource 9 (224) and ends at resource 10 (226). Resource 1 (210) and resource 6 (222) are designated as hub resources, or hubs.

The navigation map 200 is represented in four exemplary navigation histories 202, 204, 206, and 208. Navigation histories include resource identifiers corresponding to resources that were visited during navigation. A navigation data history can be stored in memory and used to navigate backward or forward along a path in the navigation map 200. Each of the navigation histories, 202, 204, 206, 208 represents the navigation map 200 differently.

The navigation histories 202, 204, 206, and 208 are presented to illustrate the concept of storing resource identifiers of visited resources in various exemplary orders. Resource numbers are used to identify resources in FIG. 2 for illustrative purposes only. In an actual implementation, the navigation histories would be implemented in computer-readable data structures and could include information in addition to the resource identifiers. In addition, in an actual implementation, the resource identifiers may include resource names, uniform resource identifiers (URIs), uniform resource locators (URLs), or other identifiers, rather than numbers. Alternatively, the navigation histories 202, 204, 206, and 208 could include pointers or handles to resource identifiers stored in memory. One of the exemplary navigation histories 202, 204, 206, and 208 could serve as implementations of the navigation history 108 shown in FIG. 1.

A pure temporal history 202 stores all the resource identifiers (i.e., numbers one through ten) in the order in which the resources were visited. While the pure temporal history 202 is useful because it provides a maximum amount of history information, the pure temporal history requires the most memory. In addition, the pure temporal history 202 results in the largest number of traditional "back button clicks" when the user wants to navigate back up a navigation path to a previously visited resource. For example, if the user wants to navigate from resource 10 (226) back to resource 4 (216), using the traditional back button will require eleven button clicks.

By contrast, a stack-based navigation history 204 does not include all of the previously visited resource identifiers. The stack-based navigation history 204 uses a "push" and "pop" scheme to add and remove resource identifiers from the history 204. The stack-based navigation history 204 removes (pops) resource 2 (212), resource 3 (214), and resource 4 (216) when navigation branches from resource 1 (210) to resource 5 (218). Similarly, resource 7 and resource 8 (220) are removed from the stack-based navigation history 204 when navigation branches from resource 6 (222) to resource 9 (224). As illustrated, the grayed-out numbers in the stack-based navigation history 204 indicate that those identifiers have been removed from the history 204. As a result, using a traditional back button and the stack-based navigation history 204, the user cannot navigate backward to resource 2 (212), resource 3 (214), resource 4 (216), resource 7, and resource 8 (220) from resource 10 (226).

Another type of navigation history is the temporal with latest hub visits (TLHV) history 206. The TLHV history 206 stores visited resource identifiers temporally. The TLHV history 206 maintains only the latest visit of any hubs as well as one instance of visits to each other resource in the map 200. The TLHV history 206 does not duplicate certain resource identifiers that are unnecessary. For example, because resource 7 can be visited from resource 8 (220), resource 7 is not duplicated in the TLHV history 206 on both sides of resource 8 (220). When navigation branches from resource 1 (210) the second time to resource 5 (218), the first visit to resource 1 (210) is removed from the TLHB history 206.

Another history, the temporal with all hub visits (TAHV) history 208, is similar to the TLHV history 206, except that the TAHV history 208 does not remove prior instances of hub visits. Thus, resource 1 (210) and resource 6 (220), both of which are hubs, are maintained on the TAHV history 108 (as shown by the circled numbers 1 and 6 in the TAHV stack 208. The TLHV history 206 and the TAHV history 208 reduce the amount of navigation data as compared to the pure temporal history 202, but retain enough navigation data that all the visited resources can be revisited using a back button, unlike the stack-based navigation history 204.

In addition, any hubs are marked as target resources in the TAHV history 208 and the TLHV history 206 so that intelligent backward navigation can be used to quickly access the hubs. With the TAHV history 208 and the TLHV history 206, visited resources can be intelligently navigated to without visiting intervening resources in a navigation path. For example, if the browser is currently at resource 10 (226), by clicking once on an intelligent backward navigation button, the browser navigates directly to resource 6 (222) without visiting resource 9 (224). Intelligent backward navigation is discussed in detail with respect to a number of exemplary browser window illustrations that follow.

Another type of navigation history is a temporal with earliest hub visits (TEHV) (not shown). The TEHV history is somewhat similar to the TLHV history 206 described above; however, the TEHV history keeps a resource identifier at a place in the history corresponding to only the earliest visit to the associated resource.

In an actual implementation, complete temporal navigation history 202 is stored in navigation history 108 (FIG. 1) and subsets of the history navigation, such as history 204, history 206, history 208, and the like are extracted and presented in the session overview based on configuration settings and resource navigation context.

Exemplary Browser Window Features

Figure 3:
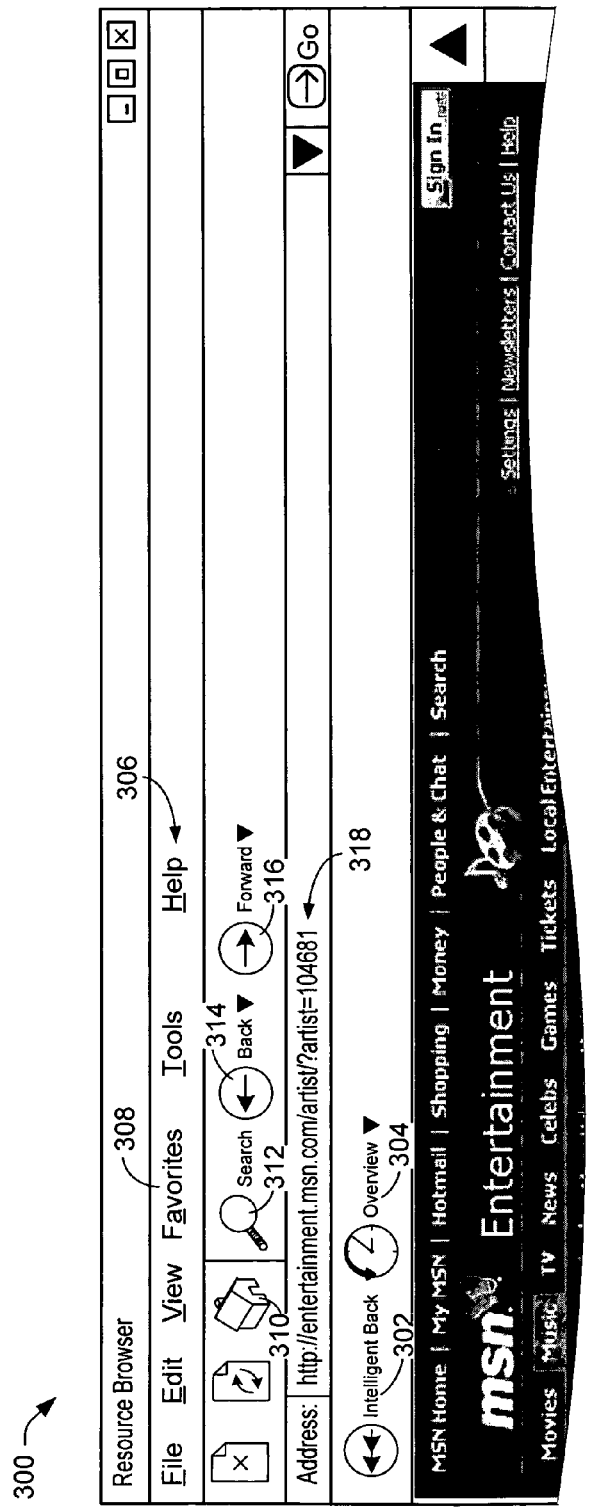
FIG. 3 illustrates a portion of a browser window including a browser session overview button.

FIG. 3 illustrates a portion of a browser window 300 that serves as an interface to a browser application program and/or an intelligent navigation module. Unlike traditional browser windows, the browser window 300 includes an intelligent backward navigation button 302 and a browser session overview button 304. The intelligent backward navigation button 302 enables a user to navigate to target resources that have been designated in the navigation history.

The browser window 300 may also include traditional navigation tools for visiting resources. For example, a menu 306 includes a user selectable list of "favorites" 308, a "home" icon 310 for navigating to a home page, a "search" icon 312 for navigating to a search page, a traditional back button 314, a traditional forward button 316, and an address entry field 318 for manually entering a resource identifier. Some of the traditional navigating tools have certain drawbacks that are noted in the Background section of this application.

When the user selects the intelligent backward navigation button 302, the browser application program navigates to a target resource, without visiting intervening resources in a navigation path. Briefly, a target resource is a resource that has been identified as a target based on user navigation and/or user input. Examples of target resources are hubs, form submission results (e.g., search results web page), user-designated targets, or resources associated with identifiers that the user typed in or selected from the "favorites" list. Target resources and the intelligent backward navigation button 302 are discussed in greater detail in related U.S. patent application Ser. No. 10/839,924, entitled "Intelligent Backwards Resource Navigation,".

As is discussed in further detail with regard to FIGS. 4-6 below, the browser session overview button 304 presents a browser session overview when it is selected. A browser session overview includes one or more resource identifiers in a navigation history. The browser session overview captures the resource navigation context and uses history configuration settings to select and present the appropriate part of the resource navigation history. In implementations shown below, the browser session overview is presented in a drop-down menu on the screen. The user can select a resource identifier from the browser session overview to navigate to the associated resource.

Figure 4:
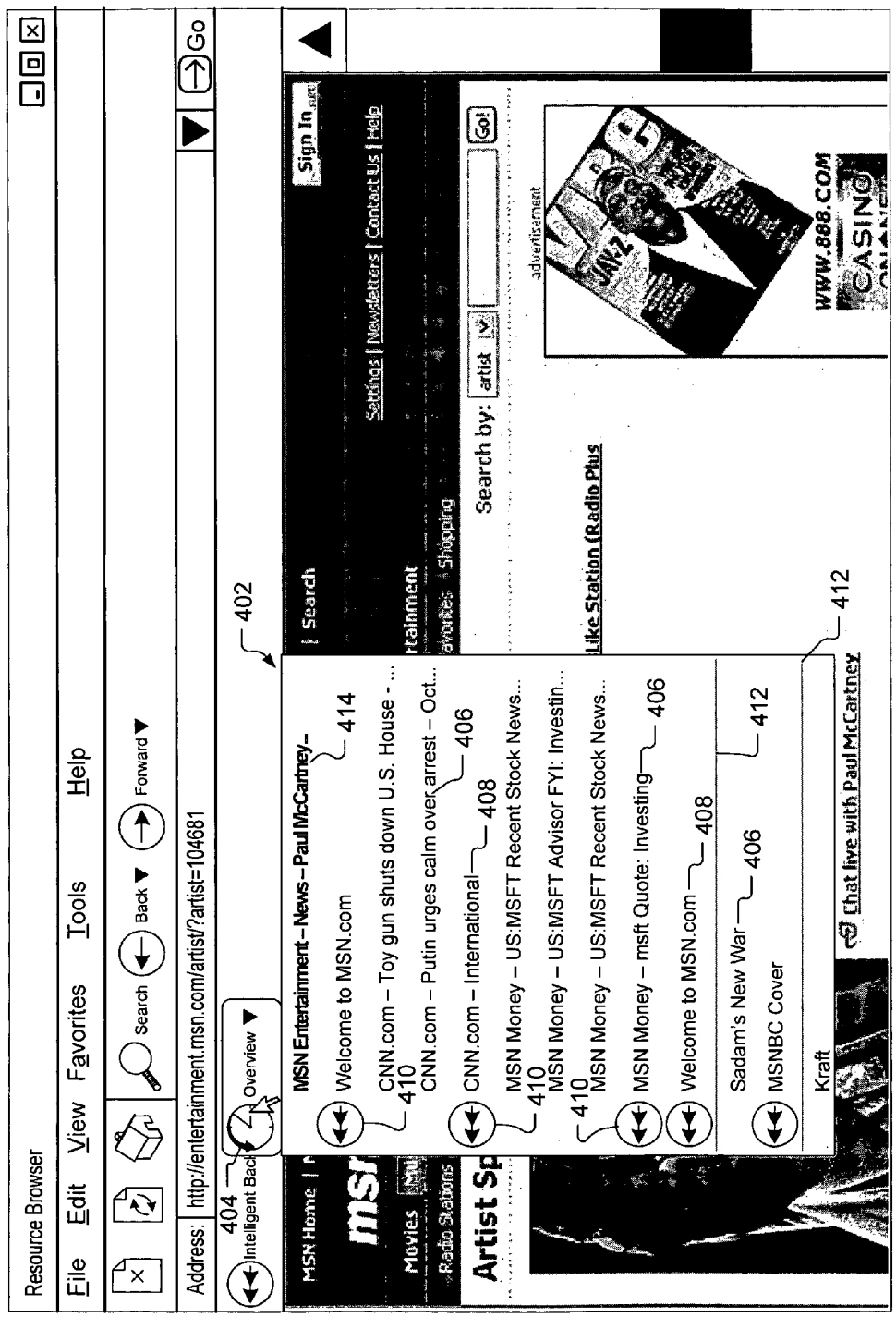
FIG. 4 illustrates another portion of a browser window wherein a browser session overview is presented when the browser session overview button is selected.

FIG. 4 illustrates another portion of a browser window 400 wherein a browser session overview 402 is presented when a browser session overview button 404 is selected. The browser session overview 402 presents a number of resource identifiers 406 associated with previously visited resources. Some of the resource identifiers 406 are target resource identifiers 408, which are associated with resources that are designated as target resources. The target resource identifiers 408 each are presented adjacent to a target resource icon 410 to indicate that the associated resource is a target resource. The currently viewed resource 414 is indicated in bold.

The user may select a resource identifier 406 or a resource icon 410 to browse the associated resource. In one implementation, the user may select a resource identifier 406 or resource icon by "clicking" on, or "hovering" over, the resource identifier 406 or the resource icon 410. The term "click" refers to a press and release of a button on a mouse or other pointing device. A "click" generates an event, specifying the screen position, which is processed by a browser session overview module. Hovering is discussed below with reference to FIG. 6. When a resource identifier 406 or a resource icon 410 is clicked on, the browser application navigates to the associated resource, which is thereby presented in the main browser window 400.

The order of presentation and the number of the resource identifiers 406 presented in the browser session overview 402 is based on a history presentation setting. Various types of history presentation settings can be implemented and may be user-selectable. The history presentation setting associated with the particular browser session overview 402 shown in FIG. 4 is a temporal or chronological setting, in time reverse order, with only the latest occurrences of resource identifiers being included. A session divider 412 is optionally (dependent on configuration settings) presented between groups of resource identifiers 406 from different sessions or between distinct branches of resource navigation, or between sequences of navigation associated with different target resources.

Resource navigation context determines which history sequence is to be included in the session overview display, in accordance with the order and number of resource identifiers specified in the configuration settings. In FIG. 4 the display includes the resources viewed in the proximity of the currently viewed resource 414. As the user selects a resource from the display by clicking on the resource identifier or navigates to some other resource by other means, the set of displayed resources will change in accordance with the change in the navigation context as a new resource is being displayed in the browser window 400.

Figure 5:
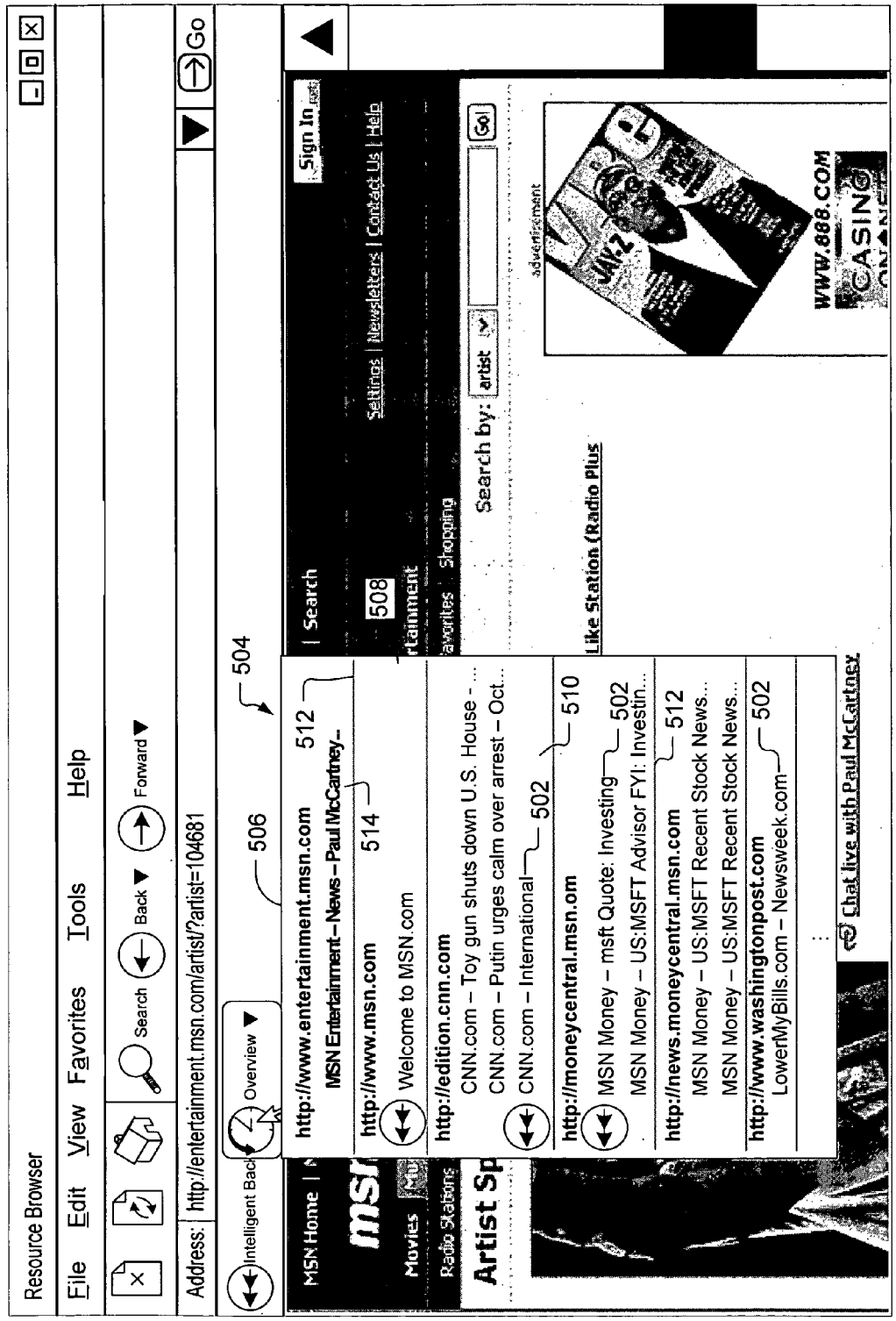
FIG. 5 illustrates yet another portion of a browser window wherein resource identifiers are grouped by domain name in the browser session overview.

FIG. 5 illustrates yet another portion of a browser window 500 wherein resource identifiers 502 are grouped by domain name in an exemplary browser session overview 504. To illustrate, a first group 506 includes resource identifiers related to domain name "msn.com", a second group 508 includes resource identifiers related to domain name "entertainment.msn.com", and a third group 510 includes resource identifiers related to domain name "edition.cnn.com". The order is an inverse chronological order of resource domains in which resources have been visited, starting with the domain that corresponds to the currently viewed resource 514. Within the groups, more than one resource identifier may or may not be presented in a specified order, such as chronologically, alphabetically, or other. The domain name groups are optionally divided by group dividers 512.

Figure 6:
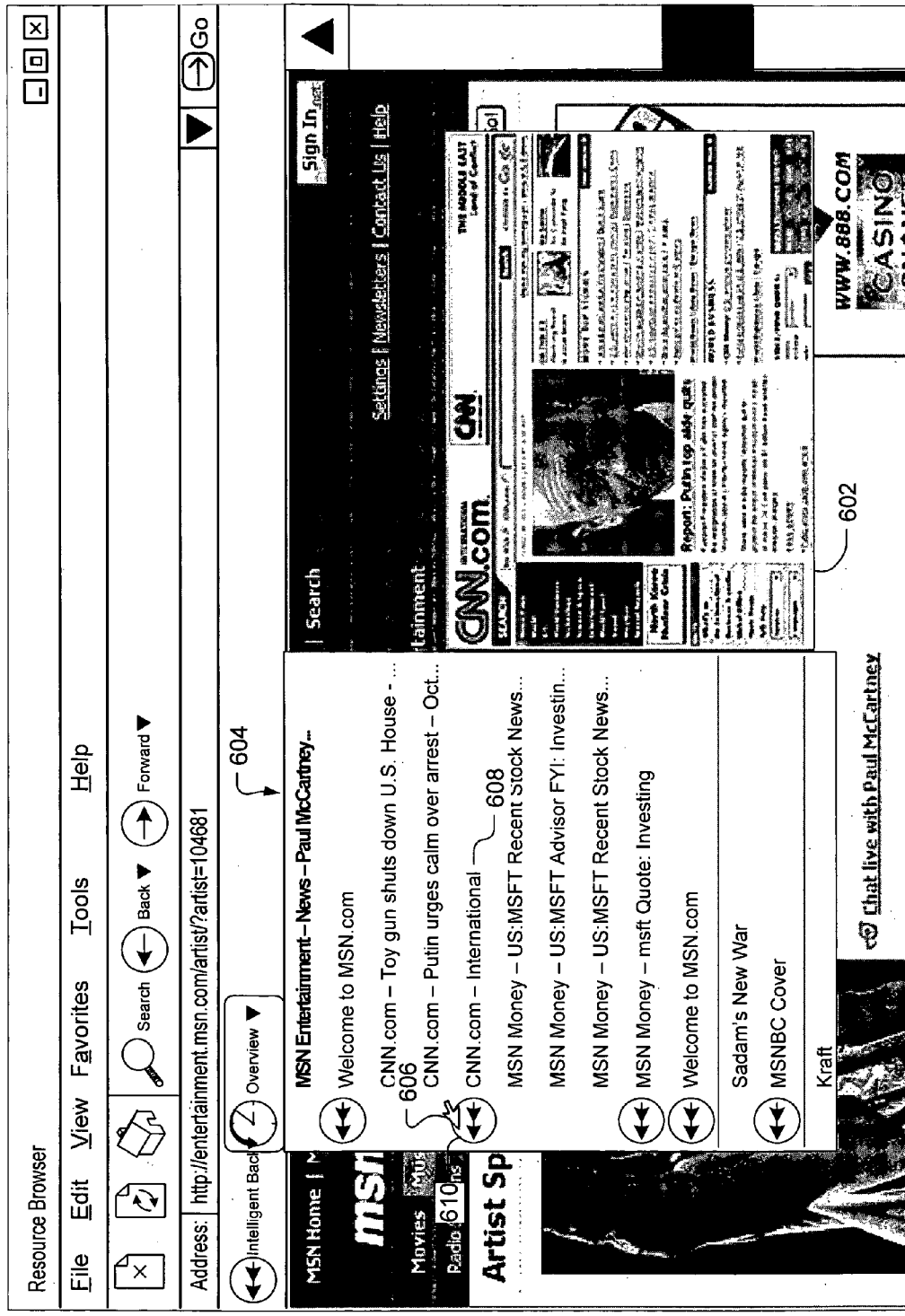
FIG. 6 illustrates yet another portion of a browser window wherein a thumbnail of a resource identified in the browser session overview is displayed when a pointer icon is positioned over the resource identifier.

FIG. 6 illustrates yet another portion of a browser window 600 wherein a thumbnail 602 of a resource identified in the browser session overview 604 is displayed when a pointer icon 606 is hovered over or near the resource identifier 608 or a target resource icon 610, if the icon is present. Hovering over or near an identifier or icon occurs when the pointer icon 606 is positioned over or near the identifier or icon for a specified length of time. Thus, hovering can occur when the pointer is adjacent to the identifier but not over the text of the identifier. Hovering generates an event, specifying the screen location, which is processed by a browser session overview module. The thumbnail 602 is presented within a tool tip window, in the proximity of the resource identifier. By hovering over the resource identifier 608 or a target resource icon 610 to obtain the thumbnail 602, the user can preview the contents of the associated resource.

Thumbnail 602 of a resource is created at the time the resource is viewed and stored in the history data storage from it can be retrieved and presented in the overview display. In one implementation, the browser session overview module periodically updates the thumbnails of all or selected previously viewed resources, independently from viewing the resource by the user, by downloading the resource in the background browser and creating the updated thumbnail. In this manner the user can view a more recent thumbnail of the resource.

In another implementation, when the browser session overview module detects hovering over a resource identifier 608 or a resource icon 610, the browser session overview attempts to retrieve the contents of the associated resource from a memory cache. A memory cache is typically used by browser applications to store resources, such as web pages, that have been visited to allow for quick retrieval when the user wants to re-visit a resource. If a selected resource is in the cache, the browser session overview module can quickly retrieve the contents of the resource and present the contents in the thumbnail window 602.

Figure 7:
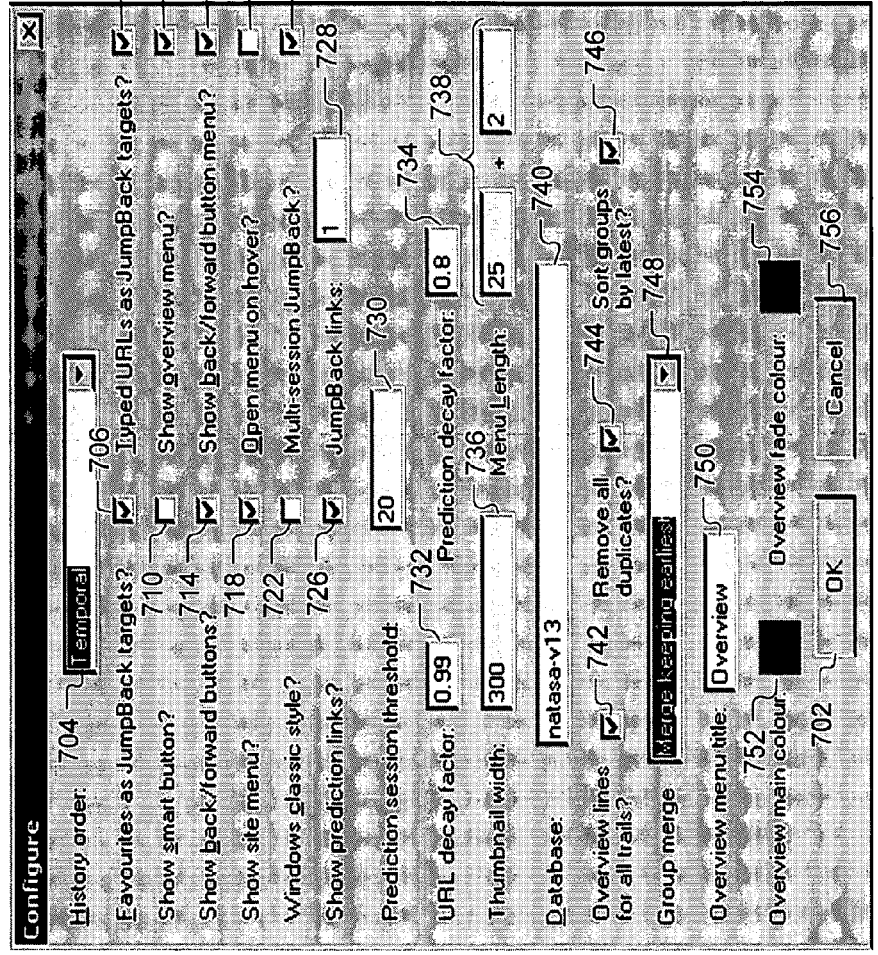
FIG. 7 illustrates a configuration window through which a user can specify various settings related to intelligent navigation, including browser session overview settings.

FIG. 7 illustrates a configuration window 700 through which a user can configure the browser. The configuration window 700 can be used to store settings related to a variety of aspects of a browser employing intelligent backward navigation, including presentation of resource identifiers and navigation controls, as well as designation of resources as targets. The user may access the configuration window 700 at any time to modify or inspect settings. When the user selects an "OK" button 702, the settings are stored persistently and are used across browser sessions.

With specific reference to the exemplary settings in the configuration window 700, a history order field 704 is used to choose the history presentation setting that designates the order of presentation of resource identifiers in a browser session overview. In a particular implementation of the configuration window 700, the history presentation settings include chronological (e.g., temporal with latest hub visits (TLHV), temporal with all hub visits (TAHV), or temporal with earliest hub visits (TEHV)), or domain-name grouped.

A favorites designation selector 706 enables the user to specify whether, when a favorite resource is navigated to through the favorites list, the favorite resource is designated as a target resource. A typed URL selector 708 enables the user to specify whether a target resource is designated when an associated URL is typed in. A show smart button selector 710 enables a user to specify that the intelligent backward navigation button be displayed or not displayed.

A show overview menu selector 712 enables the user to specify that a menu including the overview button is or is not displayed. A show back/forward buttons selector 714 enables the user to specify that traditional back and forward buttons are or are not displayed. A show back/forward button menu selector 716 enables the user to specify that menu having the traditional back and forward buttons is or is not displayed. A show site menu selector 718 enables the user to specify whether a site menu is or is not displayed.

An open menu on hover selector 720 enable the user to specify whether a menu is or is not opened when the pointer icon is hovered over the button. A WINDOWS classic style selector 722 enables the user to specify whether or not the presentation of the menus, buttons, and other icons are in a WINDOWS classic style.

A multi-session jumpback selector 724 enables the user to specify whether or not intelligent backward navigation is to navigate to target resources designated in previous browser sessions. A show prediction links selector 726 enables the user to specify whether or not smart favorites prediction links are shown in the browser overview presentation. For more information related to the show prediction links selector 726, refer to related U.S. patent application Ser. No. 10/839,903, entitled "Intelligent Forward Resource Navigation,".

A jumpback links field 728 enables the user to specify a number of intelligent backward navigation target resources to store in the navigation history. A prediction session threshold field 730 enables the user to specify a prediction session threshold related to intelligent forward navigation, which is discussed in further detail in related U.S. patent application Ser. No. 10/839,903, entitled "Intelligent Forward Resource Navigation,".

A URL decay factor field 732 and prediction decay factor field 734 enable the user to specify a factor related to URL predictions which is discussed in further detail in related U.S. patent application Ser. No. 10/839,903, entitled "Intelligent Forward Resource Navigation,".

A thumbnail width field 736 enables the user to specify the width of thumbnails presented to the user. Menu length fields 738 enable the user to specify the length of the browser window menu in terms of the maximum number of resource identifiers to be displayed.

A database field 740 enables the user to specify a database for storing navigation history and configuration data. An overview lines selector 742 enables the user to specify whether overview lines are to be presented for all navigation paths in a navigation map. A remove all duplicates selector 744 enables the user to specify whether duplicate target resource visits are or are not removed from the navigation history. When the remove all duplicates selector 744 is checked, the navigation history will be maintained in a manner such as is shown in the TLHV stack 206 (FIG. 2). Conversely, when the remove all duplicates selector 744 is not checked, the navigation history will be maintained in a manner such as is shown in the TAHV stack 208 (FIG. 2).

A sort groups by latest selector 746 enables the user to specify whether or not a group of resource identifiers in a common domain are sorted in sequential order according to time of visit, when the resource identifiers are shown in browser session overview. A group merge field 748 enables the user to specify a type of group merge or no group merge. In one implementation of the configuration window 700, the types of group merges that can be specified are "merge with duplicates," "merge keeping latest," and "merge keeping earliest" visit to the resource.

An overview menu title field 750 enables the user to specify the title of the overview menu. An overview main color selector 752 enables the user to specify the main color of the overview menu which designates the resources that were displayed in the current browser window. An overview fade color selector 754 enables the user to specify the fade color that is used to indicate resources displayed in browser windows other that the one displaying the currently viewed resource. After the user specifies the configuration settings in the configuration window 700, the user can save the settings by selecting the "OK" button, or cancel (i.e., not save) the settings by selecting a "Cancel" button 756.

Figure 8:
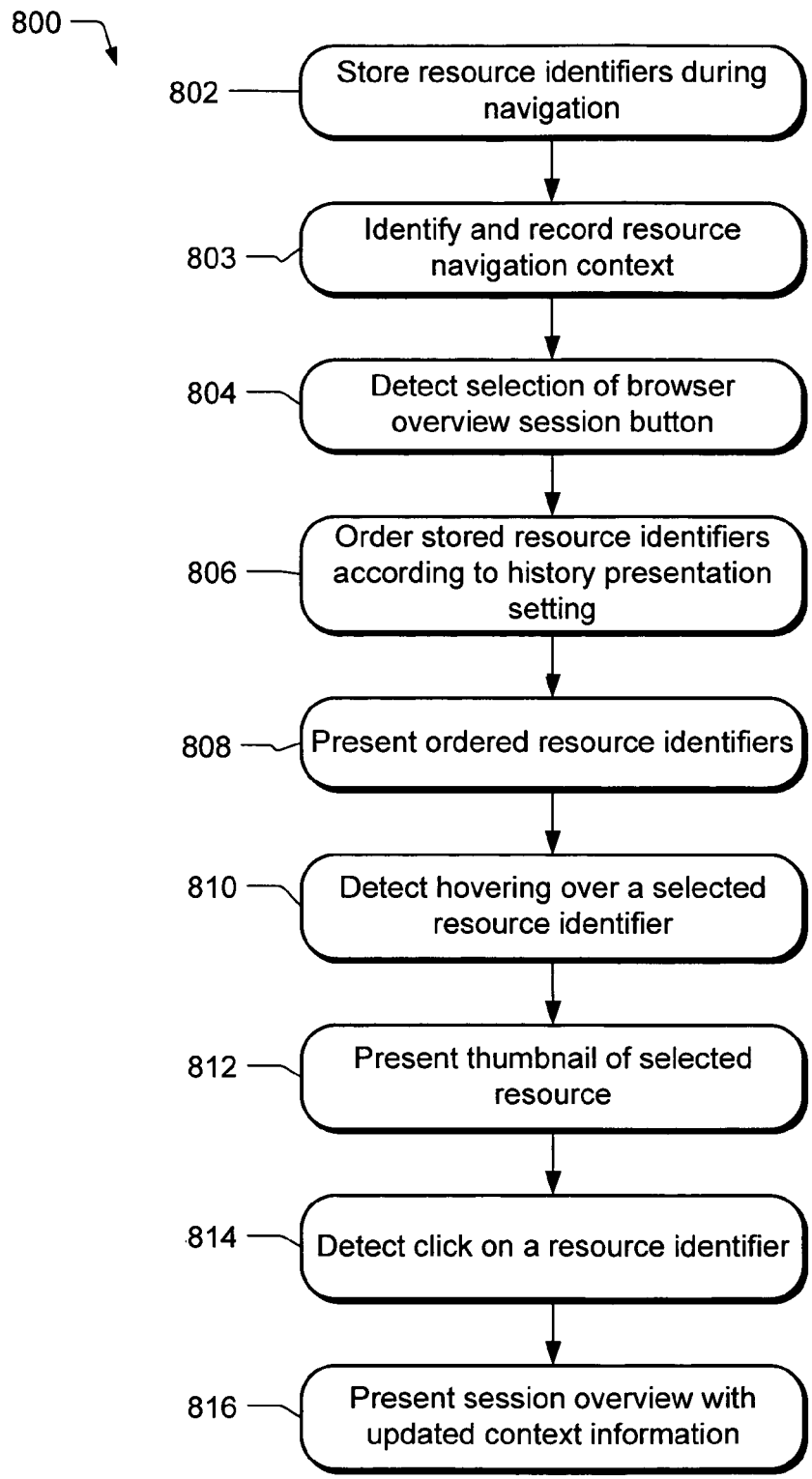
FIG. 8 are flowcharts having exemplary operations for performing browser session overview.

Exemplary operations for presenting a browser session overview are discussed in detail with respect to an algorithm shown in FIG. 8.

Exemplary Operations

Described herein are exemplary methods for implementing browser session overview. The methods described herein may be embodied as logic instructions on one or more computer-readable medium. When executed on a processor, the logic instructions cause a general purpose computing device to be programmed as a special-purpose machine that implements the described methods. In the following exemplary operations, the components and connections depicted in the figures may be used to implement browser session overview.

FIG. 8 is a browser session overview algorithm 800 having exemplary operations for generating a browser session overview. In general, when the user selects a browser session overview button, resource identifiers in a navigation history are ordered according to a history presentation setting and presented to the user.

A storing operation 802 captures navigation events and stores resource identifiers and associated information (such as URI, title, type of navigation to and from the resource, and thumbnail) in a navigation history. The storing operation 802 may store the resource identifiers in a specified order, such as a chronological order with only the latest occurrences of duplicate resource identifiers stored, or chronological order with only the earliest occurrences of duplicate resource identifiers stored. Resource identifiers may be stored in any other order as may be known in the art. In one implementation the storing operation 802 stores the complete navigation sequence in chronological order, such that the data can be reordered flexibly based on user selected history configuration settings.

The context detection operation 803 identifies the context of the current resource navigation and viewing. This context is stored in memory and exploited in the operation 808 which presents the resources in the session overview. In one implementation the resource navigation context is the currently viewed resource identifier, including resource URI, resource name, and resource domain. In another implementation multiple resource navigation contexts are available and can be specified by the user from the context management menu.

A detecting operation 804 detects selection of a browser session overview button. In one implementation, the detecting operation 804 detects a mouse button click. Detecting operation 804 may include sending an event to a browser session overview module, which processes the event.

An ordering operation 806 orders or sorts the stored resource identifiers from the storing operation 802. The ordering operation 806 orders the resource identifiers and filters out duplicates according to history presentation settings, which designate the format in which the resource identifiers should be presented. Exemplary history presentation settings and their associated orders of presentation are discussed above with respect to FIG. 4, FIG. 5, and FIG. 7.

A presenting operation 808 presents the ordered resource identifiers on top of the browser window. In one implementation, the presenting operation 808 presents the ordered resource identifiers in a drop-down menu. Through the drop-down menu, the user can select one of the resource identifiers by either clicking on the resource identifier or hovering the pointer icon over the resource identifier.

A detecting operation 810 detects that the pointer icon is hovering over a resource identifier. In one implementation, the detecting operation 810 involves sending an event to the browser session overview module to notify the module of the hovering.

A presenting operation 812 presents a thumbnail of the resource identified by the resource identifier over which the pointer icon was hovered. In one implementation of presenting operation 812 the thumbnail is retrieved from the navigation history data storage and displayed in the session overview. In an alternative implementation of the presenting operation 812 a cache of previously stored resources is searched for the selected resource. If the selected resource is found in the cache, the contents of the resource are presented in the thumbnail size browser window.

A detecting operation 814 detects a click on a resource identifier. In one implementation, the detecting operation 814 involves sending an event to the browser window to upload the selected resource and to the session overview module to record the change in the current resource identifier.

A presenting operation 816 presents a session overview with the updated current resource indicator. One implementation of the presenting operation 816 provides a context specific display of resource navigation history. Resource navigation context can include information about the currently viewed resource. In this implementation, user navigation history is presented immediately preceding the currently viewed resource, clearly indicating (e.g., in bold font) the current resource in the resource list.

Exemplary Computing Device

FIG. 9 is a schematic illustration of an exemplary computing device 900 that can be used to implement the exemplary systems, methods, browser window features discussed herein. Computing device 900 includes one or more processors or processing units 932, a system memory 934, and a bus 936 that couples various system components including the system memory 934 to processors 932. The bus 936 represents one or more of any of several types of bus structures, including a memory bus or memory controller, a peripheral bus, an accelerated graphics port, and a processor or local bus using any of a variety of bus architectures. The system memory 934 includes read only memory (ROM) 938 and random access memory (RAM) 940. A basic input/output system (BIOS) 942, containing the basic routines that help to transfer information between elements within computing device 900, such as during start-up, is stored in ROM 938.

Computing device 900 further includes a hard disk drive 944 for reading from and writing to a hard disk (not shown), and may include a magnetic disk drive 946 for reading from and writing to a removable magnetic disk 948, and an optical disk drive 950 for reading from or writing to a removable optical disk 952 such as a CD ROM or other optical media. The hard disk drive 944, magnetic disk drive 946, and optical disk drive 950 are connected to the bus 936 by appropriate interfaces 954*a*, 954*b*, and 954*c*.

The drives and their associated computer-readable media provide nonvolatile storage of computer-readable instructions, data structures, program modules and other data for computing device 900. Although the exemplary environment described herein employs a hard disk, a removable magnetic disk 948 and a removable optical disk 952, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 944, magnetic disk 948, optical disk 952, ROM 938, or RAM 940, including an operating system 958, one or more application programs 960, other program modules 962, and program data 964. A user may enter commands and information into computing device 900 through input devices such as a keyboard 966 and a pointing device 968. Other input devices (not shown) may include a microphone, joystick, game pad, satellite dish, scanner, or the like. These and other input devices are connected to the processing unit 932 through an interface 956 that is coupled to the bus 936. A monitor 972 or other type of display device is also connected to the bus 936 via an interface, such as a video adapter 974.

Generally, the data processors of computing device 900 are programmed by means of instructions stored at different times in the various computer-readable storage media of the computer. Programs and operating systems may be distributed, for example, on floppy disks, CD-ROMs, or electronically, and are installed or loaded into the secondary memory of the computing device 900. At execution, the programs are loaded at least partially into the computing device's 900 primary electronic memory.

Computing device 900 may operate in a networked environment using logical connections to one or more remote computers, such as a remote computer 976. The remote computer 976 may be a personal computer, a server, a router, a network PC, a peer device or other common network node, and typically includes many or all of the elements described above relative to computing device 900. The logical connections depicted in FIG. 9 include a LAN 980 and a WAN 982. The logical connections may be wired, wireless, or any combination thereof.

The WAN 982 can include a number of networks and subnetworks through which data can be routed from the computing device 900 and the remote computer 976, and vice versa. The WAN 982 can include any number of nodes (e.g., DNS servers, routers, etc.) by which messages are directed to the proper destination node.

When used in a LAN networking environment, computing device 900 is connected to the local network 980 through a network interface or adapter 984. When used in a WAN networking environment, computing device 900 typically includes a modem 986 or other means for establishing communications over the wide area network 982, such as the Internet. The modem 986, which may be internal or external, is connected to the bus 936 via a serial port interface 956.

In a networked environment, program modules depicted relative to the computing device 900, or portions thereof, may be stored in the remote memory storage device. It will be appreciated that the network connections shown are exemplary and other means of establishing a communications link between the computers may be used.

The computing device 900 may be implemented as a server computer that is dedicated to server applications or that also runs other applications. Alternatively, the computing device 900 may be embodied in, by way of illustration, a stand-alone personal desktop or laptop computer (PCs), workstation, personal digital assistant (PDA), or electronic appliance, to name only a few.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed is:

1. One or more non-transitory computer readable storage media comprising instructions that, when executed by one or more computing devices, perform:
   storing, in a common navigation history, a first group of resource identifiers accessed by a user during a first browsing session using a first browser window;
   storing, in the common navigation history, a second group of resource identifiers accessed by the user during a second browsing session using a second browser window, wherein the second group of resource identifiers are accessed by the user while the first browsing session and the second browsing session are executing simultaneously;
   detecting selection of a browser session overview button in the first window;
   responsive to the detecting, displaying in the first browser window at least part of the common navigation history, including:
      the first group of resource identifiers;
      the second group of resource identifiers that are accessed while both the first browsing session and the second browsing session are executing simultaneously; and
      a graphic session divider, wherein the first group of resource identifiers are displayed together on a first side of the graphic session divider and the second group of resource identifiers are displayed together on a second side of the graphic session divider that is different from the first side of the graphic session divider; and
   dynamically updating, without user intervention, the displaying of the common navigation history while the first browsing session and the second browsing session are executing simultaneously, the displaying being dynamically updated, without user intervention, in the first browser window to reflect further resource identifiers that are accessed using the second browser window during the simultaneously executing the first and the second browsing sessions, regardless of the order in which the further resource identifiers are accessed using the first and second browser windows, such that:
      the further resource identifiers accessed using the second browser window are separated by the graphic session divider from the first group of resource identifiers, and displayed together with the second group of resource identifiers on the second side of the graphic session divider; and
      the further resource identifiers accessed using the first browser window are displayed together with the first group of resource identifiers on the first side of the graphic session divider.

2. The one or more non-transitory computer readable storage media as recited in claim 1 wherein the first group or the second group of resource identifiers are presented in a history presentation order selected by a user.

3. The one or more non-transitory computer readable storage media as recited in claim 1, further comprising instructions that, when executed by the one or more computing devices, perform:
   detecting a user selection of a history presentation order dictating an order in which the first group or the second group of resource identifiers are to be presented.

4. The one or more non-transitory computer readable storage media as recited in claim 1, further comprising instructions that, when executed by the one or more computing devices, perform:
   presenting the first group or the second group of resource identifiers in a temporal sequence.

5. The one or more non-transitory computer readable storage media as recited in claim 1, further comprising instructions that, when executed by one or more computing devices perform:
   presenting only one occurrence of each of the first group or the second group of resource identifiers in a temporal sequence.

6. The one or more non-transitory computer readable storage medium as recited in claim 1, further comprising instructions that, when executed by one or more computing devices perform:
   presenting only a latest occurrence of each of the first group or the second group of resource identifiers in a temporal sequence.

7. The one or more non-transitory computer readable storage media as recited in claim 1, further comprising instructions that, when executed by one or more computing devices perform:
   presenting only an earliest occurrence of each of the first group or the second group of resource identifiers in a temporal sequence.

8. The one or more non-transitory computer readable storage media as recited in claim 1, further comprising instructions that, when executed by one or more computing devices perform:
   presenting a thumbnail of at least one of the first group or the second group of resource identifiers.

9. The one or more non-transitory computer readable storage media as recited in claim 1, further comprising instructions that, when executed by one or more computing devices perform:
   presenting a thumbnail of a selected one of the first group or the second group of resource identifiers in response to detecting a pointer icon positioned over the selected resource identifier.

10. The one or more non-transitory computer readable storage media as recited in claim 1 wherein the first group or the second group of resource identifiers are presented in a user-selected chronological order.

11. The one or more non-transitory computer readable storage media as recited in claim 1 wherein the first group or the second group of resource identifiers are presented in chronological order and grouped by domain name.

12. The one or more non-transitory computer readable storage media as recited in claim 1, further comprising instructions that, when executed by one or more computing devices perform:
   presenting a thumbnail of a selected resource associated with one of the first group or the second group of resource identifiers by retrieving the selected resource from a cache.

13. The computer readable storage medium of claim 1, wherein the part of the common navigation history presented in the first browser window comprises a graphic tree structure.

14. A system for navigating among resources comprising:
   a processor; and
   a memory operably connected to the processor, the memory including,
      a navigation event capture module configured to store resource identifiers identifying associated visited resources in a navigation history, including a first group of resource identifiers accessed during a first browsing session and a second group of resources accessed during a second browsing session, wherein the second group of resource identifiers are accessed while the first browsing session and the second browsing session are executing simultaneously;

an overview module configured to:

display, in a browser window:

a presentation of at least some of the first group of resource identifiers and at least some of the second group of resource identifiers that are accessed while the first browsing session and the second browsing session are executing simultaneously;

a graphic session divider, wherein the first group of resource identifiers are displayed together on a first side of the graphic session divider and the second group of resource identifiers are displayed together on a second side of the graphic session divider that is different from the first side of the graphic session divider; and dynamically update, without user intervention, the presentation of the common navigation history while the first browsing session and the second browsing session are executing simultaneously, the presentation being dynamically updated, without user intervention, in the browser window to reflect further resource identifiers that are accessed during the simultaneously executing the first and the second browsing sessions, regardless of the order in which the further resource identifiers are accessed using the first and second browser windows, such that:

the further resource identifiers accessed using the second browser window are separated from the first group of resource identifiers with the session divider, and displayed together with the second group of resource identifiers on the second side of the graphic session divider; and the further resource identifiers accessed using the first browser window are displayed together with the first group of resource identifiers on the first side of the graphic session divider.

15. A system as recited in claim 14 wherein the navigation history is simultaneously accessible through more than one browser window.

16. A system as recited in claim 14 further comprising a configuration storing one of a plurality of history presentation settings, the history presentation settings reflecting designated orders for presenting the resource identifiers stored in the navigation history.

17. A system as recited in claim 16 further comprising a presentation module configured to present a browser session overview button enabling a user to view the resource identifiers in the order designated by the one of a plurality of history presentation settings.

18. A system as recited in claim 16 further comprising a presenting module configured to present a configuration window having a history presentation setting field enabling a user to select one of the plurality of history presentation settings.

19. A system as recited in claim 14 wherein the overview module is configured to present the browser window in response to a user selecting an overview button.

20. A method comprising:

storing, in a common navigation history on a storage device, a first group of resource identifiers accessed by a user during a first browsing session using a first browser window;

storing, in the common navigation history, a second group of resource identifiers accessed by the user during a second browsing session using a second browser window, wherein the second group of resource identifiers are accessed by the user while the first browsing session and the second browsing session are executing simultaneously;

detecting the selection of a browser session overview button in the first browsing window;

responsive to the detecting, displaying in the first browser window at least part of the common navigation history, including:

the first group of resource identifiers;

the second group of resource identifiers that are accessed while both the first browsing session and the second browsing session are executing simultaneously; and a graphic session divider, wherein the first group of resource identifiers are displayed together on a first side of the graphic session divider and the second group of resource identifiers are displayed together on a second side of the graphic session divider that is different from the first side of the graphic session divider; and dynamically updating, without user intervention, the displaying of the common navigation history while the first browsing session and the second browsing session are executing simultaneously, the displaying being dynamically updated, without user intervention, in the first browser window to reflect further resource identifiers that are accessed using the second browser window during the simultaneously executing the first and the second browsing sessions, regardless of the order in which the further resource identifiers are accessed using the first and second browser windows, such that:

the further resource identifiers accessed using the second browser window are separated by the graphic session divider from the first group of resource identifiers, and displayed together with the second group of resource identifiers on the second side of the graphic session divider; and the further resource identifiers accessed using the first browser window are displayed together with the first group of resource identifiers on the first side of the graphic session divider.

\* \* \* \* \*

UNITED STATES PATENT AND TRADEMARK OFFICE
CERTIFICATE OF CORRECTION

PATENT NO. : 7,962,843 B2
APPLICATION NO. : 10/839910
DATED : June 14, 2011
INVENTOR(S) : Natasa Milic-Frayling et al.

It is certified that error appears in the above-identified patent and that said Letters Patent is hereby corrected as shown below:

At claim 1, line 1, delete "non-transitory" and "readable."
At claim 2, line 1, delete "non-transitory" and "readable."
At claim 3, line 1, delete "non-transitory" and "readable."
At claim 4, line 1, delete "non-transitory" and "readable."
At claim 5, line 1, delete "non-transitory" and "readable."
At claim 6, line 1, delete "non-transitory" and "readable"; and at claim 6, line 2, delete "medium" and insert therefore --media--.
At claim 7, line 1, delete "non-transitory" and "readable."
At claim 8, line 1, delete "non-transitory" and "readable."
At claim 9, line 1, delete "non-transitory" and "readable."
At claim 10, line 1, delete "non-transitory" and "readable."
At claim 11, line 1, delete "non-transitory" and "readable."
At claim 12, line 1, delete "non-transitory" and "readable."

Signed and Sealed this
Twenty-first Day of August, 2012

David J. Kappos
*Director of the United States Patent and Trademark Office*

UNITED STATES PATENT AND TRADEMARK OFFICE
CERTIFICATE OF CORRECTION

PATENT NO. : 7,962,843 B2  
APPLICATION NO. : 10/839910  
DATED : June 14, 2011  
INVENTOR(S) : Natasa Milic-Frayling et al.

Page 1 of 1

It is certified that error appears in the above-identified patent and that said Letters Patent is hereby corrected as shown below:

Column 15, line 7 (claim 1, line 1) delete "non-transitory" and "readable."

Column 15, line 57 (claim 2, line 1) delete "non-transitory" and "readable."

Column 15, line 61 (claim 3, line 1) delete "non-transitory" and "readable."

Column 16, line 1 (claim 4, line 1) delete "non-transitory" and "readable."

Column 16, line 7 (claim 5, line 1) delete "non-transitory" and "readable."

Column 16, line 14 (claim 6, line 1) delete "non-transitory" and "readable."; and Column 16, line 15 (claim 6, line 2) delete "medium" and insert therefore --media--.

Column 16, line 21 (claim 7, line 1) delete "non-transitory" and "readable."

Column 16, line 28 (claim 8, line 1) delete "non-transitory" and "readable."

Column 16, line 34 (claim 9, line 1) delete "non-transitory" and "readable."

Column 16, line 42 (claim 10, line 1) delete "non-transitory" and "readable."

Column 16, line 46 (claim 11, line 1) delete "non-transitory" and "readable."

Column 16, line 50 (claim 12, line 1) delete "non-transitory" and "readable."

This certificate supersedes the Certificate of Correction issued August 21, 2012.

Signed and Sealed this  
Eleventh Day of September, 2012

David J. Kappos  
*Director of the United States Patent and Trademark Office*

UNITED STATES PATENT AND TRADEMARK OFFICE
CERTIFICATE OF CORRECTION

PATENT NO. : 7,962,843 B2
APPLICATION NO. : 10/839910
DATED : June 14, 2011
INVENTOR(S) : Natasa Milic-Frayling et al.

It is certified that error appears in the above-identified patent and that said Letters Patent is hereby corrected as shown below:

Column 16, line 9 at claim 5, line 3, insert --the-- before "one or more computing devices."
Column 16, line 16 at claim 6, line 3, insert --the-- before "one or more computing devices."
Column 16, line 23 at claim 7, line 3, insert --the-- before "one or more computing devices."
Column 16, line 30 at claim 8, line 3, insert --the-- before "one or more computing devices."
Column 16, line 36 at claim 9, line 3, insert --the-- before "one or more computing devices."
Column 16, line 52 at claim 12, line 3, insert --the-- before "one or more computing devices."
Column 16, line 58 at claim 13, line 1, delete "readable storage medium" and insert therefor --storage media--.

Signed and Sealed this
First Day of January, 2013

David J. Kappos
*Director of the United States Patent and Trademark Office*